United States Patent
Sangu

(10) Patent No.: US 7,806,467 B2
(45) Date of Patent: Oct. 5, 2010

(54) STRUCTURE OF REAR PORTION OF CAR BODY

(75) Inventor: Kaoru Sangu, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 269 days.

(21) Appl. No.: 12/052,188

(22) Filed: Mar. 20, 2008

(65) Prior Publication Data

US 2008/0231080 A1    Sep. 25, 2008

(30) Foreign Application Priority Data

Mar. 22, 2007    (JP)   ............................. 2007-075526

(51) Int. Cl.
     *B60N 2/015*    (2006.01)

(52) U.S. Cl. .............................. 296/203.04; 296/24.43; 296/187.11; 296/193.02

(58) Field of Classification Search ................ 296/1.04, 296/24.4, 24.43, 63, 187.01, 187.03, 187.11, 296/193.02, 193.08, 198, 203.04, 65.16
See application file for complete search history.

(56) References Cited

U.S. PATENT DOCUMENTS

| | | | | |
|---|---|---|---|---|
| 1,712,547 | A * | 5/1929 | Breneman et al. | ........... 296/198 |
| 2,198,653 | A * | 4/1940 | Breer et al. | ............ 296/203.04 |
| 4,234,225 | A * | 11/1980 | Harasaki et al. | ........ 296/203.04 |
| 5,735,564 | A * | 4/1998 | Coogan | .................... 296/24.43 |
| 5,788,322 | A | 8/1998 | Wolf et al. | |
| 5,819,408 | A * | 10/1998 | Catlin | ........................ 29/897.2 |
| 6,082,811 | A * | 7/2000 | Yoshida | .................. 296/187.03 |
| 6,241,309 | B1 * | 6/2001 | Roehl et al. | ............. 296/203.04 |
| 6,302,463 | B1 * | 10/2001 | Moore et al. | ............. 296/24.43 |
| 6,341,820 | B1 * | 1/2002 | Kimura et al. | ......... 297/378.13 |
| 6,443,518 | B1 | 9/2002 | Röhl et al. | |
| 6,802,558 | B2 * | 10/2004 | Matsuoka | ............... 296/203.04 |
| 7,040,639 | B2 * | 5/2006 | Tamura | ................ 280/124.147 |
| 7,073,850 | B2 * | 7/2006 | Erney et al. | ............ 296/203.04 |
| 7,222,911 | B2 * | 5/2007 | Abe et al. | .............. 296/187.11 |
| 7,325,865 | B2 * | 2/2008 | Yamazaki | .............. 296/203.04 |
| 7,481,476 | B2 * | 1/2009 | Heiss et al. | ............... 296/24.43 |
| 2003/0173799 | A1* | 9/2003 | Wendland et al. | ...... 296/187.01 |

(Continued)

FOREIGN PATENT DOCUMENTS

DE           196 42 820         6/1997

(Continued)

OTHER PUBLICATIONS

Office Action issued in Chinese Patent Application No. 200810088004.4 on Jun. 26, 2009.

(Continued)

*Primary Examiner*—Glenn Dayoan
*Assistant Examiner*—Paul A Chenevert
(74) *Attorney, Agent, or Firm*—Stein McEwen, LLP

(57) ABSTRACT

A partition panel extends in a first direction to partition a passenger room from a trunk room in the rear portion of the car body and is provided with an opening. A floor panel extends in a second direction which is different from the first direction. Upper attaching portions respectively arranged in a pair of right and left upper end portions of an X-shaped reinforcing bar are fixed to upper attached portions formed on the partition panel. Lower attaching portions respectively arranged in a pair of right and left lower end portions of the reinforcing bar are fixed to lower attached portions formed on the floor panel.

6 Claims, 7 Drawing Sheets

U.S. PATENT DOCUMENTS

2006/0202498 A1* 9/2006 Aizawa et al. ............. 296/24.4
2007/0158977 A1* 7/2007 Yasukouchi et al. .... 296/203.04
2009/0039677 A1* 2/2009 Lee ....................... 296/187.03

FOREIGN PATENT DOCUMENTS

| | | |
|---|---|---|
| EP | 0 987 168 | 3/2000 |
| JP | 59156871 A * | 9/1984 |
| JP | 61-94482 | 6/1986 |
| JP | 62074731 A * | 4/1987 |
| JP | 5-338558 | 12/1993 |
| JP | 05338558 A * | 12/1993 |
| JP | 2006-176060 | 7/2006 |

OTHER PUBLICATIONS

Office Action issued by the German Patent Office on Mar. 23, 2009.

* cited by examiner

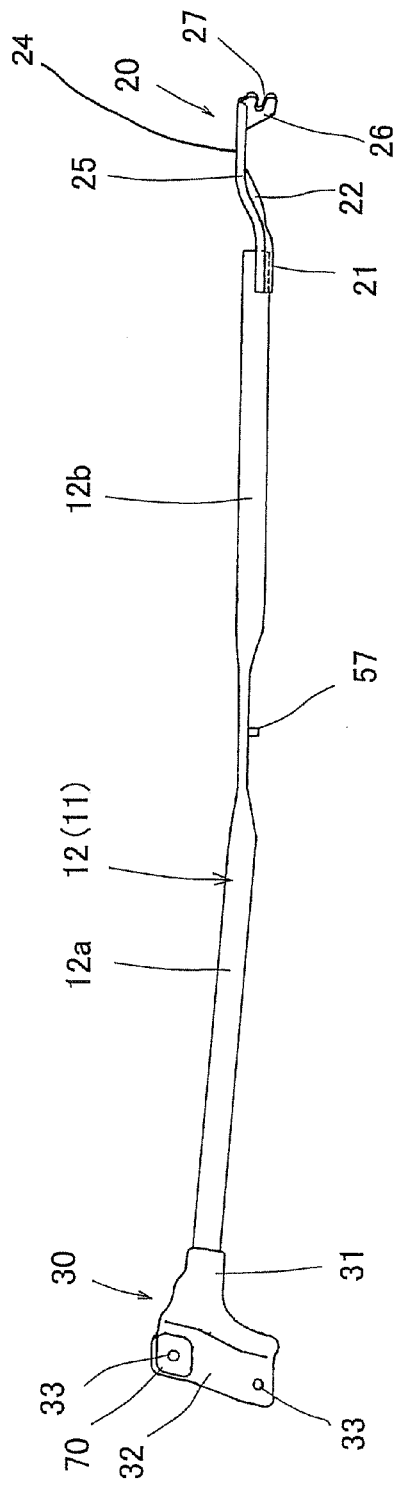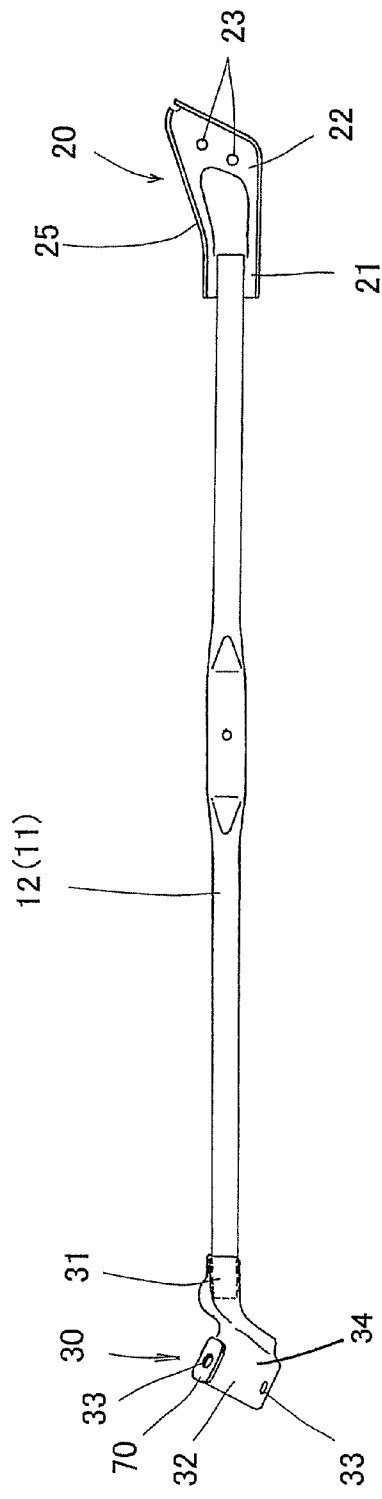
FIG. 7(a)
FIG. 7(b)

STRUCTURE OF REAR PORTION OF CAR BODY

The disclosure of Japanese Patent Application No. 2007-075526 filed on Mar. 22, 2007 including specification, drawings and claims is incorporated herein by reference in its entirety.

BACKGROUND

The present invention relates to a structure of a rear portion of a car body in which an opening portion is provided on a partition panel for partitioning a passenger room from a trunk room at the rear of the car body.

Concerning the car in which the above structure is employed, two car types are provided. One car type is a so-called trunk-through type car in which a passenger room and a trunk room are communicated with each other when a seat back of a rear seat is tilted. The other car type is a so-called seat back fixing type car in which a seat back of a rear seat is fixed to a car body.

In order to use the same car body in common for both the trunk-through type car and the seat back fixing type car, a large opening portion is formed on a partition panel. The partition panel includes: a partition front panel which is substantially vertically arranged on the rear side of the seat back; and a partition rear panel which is substantially horizontally arranged and extended from an upper end portion of the partition front panel to a rear side of the car. The opening portion described above is formed on the partition front panel.

In the seat back fixing type car described above, the opening portion is not utilized. Therefore, it is desired to enhance the rigidity of the rear portion of the car body by reducing a deterioration of the rigidity which is caused due to the opening portion formed on the partition front panel. On the periphery of the opening portion, a partition board made of resin is fixed by means of clipping so as to close the opening portion. However, it is impossible to enhance the rigidity of the rear portion of the car body by the partition board.

Therefore, in order to enhance the rigidity of the rear portion of the car body, in a first related-art, a circumferential edge portion of a reinforcing plate made of metal for closing the opening portion is welded and fixed to a floor panel or a rear deck. Further, in a second related-art, end portions of an X-shaped reinforcing bar are fixed to the car body in the longitudinal direction of the car with bolts (see Patent Document 1).

Patent Document 1: Japanese Utility Model Publication No. 61-94482A

However, according to the first related-art, the reinforcing plate is so large that the car body becomes heavy. According to the second related-art (which is described in the Patent Document 1), all of the bolt fixing directions of the end portions of the X-shaped reinforcing bar with respect to the car body are the same as the longitudinal direction of the car. Therefore, in a case where a twisting force is applied to the reinforcing bar, the force is shifted from the bolt fixing portion. Accordingly, it is impossible to sufficiently enhance the rigidity.

SUMMARY

It is therefore an object of the invention to provide a structure of a rear portion of a car body in a seat back fixing type car, in which the rigidity of the rear portion is enhanced while employing a relatively-simple reinforcement structure, when a partition panel for partitioning a passenger room from a trunk room in the rear portion of the car body is provided with an opening portion.

In order to achieve the above objects, according to an aspect of the invention, there is provided a structure of a rear portion of a car body, comprising: a partition panel, extending in a first direction to partition a passenger room from a trunk room in the rear portion of the car body and provided with an opening; a floor panel, extending in a second direction which is different from the first direction; an X-shaped reinforcing bar; wherein upper attaching portions respectively arranged in a pair of right and left upper end portions of the reinforcing bar are fixed to upper attached portions formed on the partition panel; wherein lower attaching portions respectively arranged in a pair of right and left lower end portions of the reinforcing bar are fixed to lower attached portions formed on the floor panel.

According to the above configuration, the reinforcing bar can be made lighter than a related-art reinforcing plate made of metal for closing the opening. Accordingly, a weight of the rear portion of the car body can be made light.

In this connection, while a car is running, a force is given from a suspension attaching portion to a car body. This force twists the car body. The partition panel is located at a position close to the suspension attaching portion. According to the above configuration, the upper attaching portion of the reinforcing bar is fixed to the upper attached portion of the partition panel. At the same time, the lower attaching portion of the reinforcing bar is fixed to the lower attached portion of the floor panel. Therefore, this structure can sufficiently resist a twisting force given from the suspension attaching portion. As a result, the rigidity of the car body can be enhanced.

A fixing direction of the upper attaching portion of the reinforcing bar with respect to the upper attached portion of the partition panel is the first direction. On the other hand, a fixing direction of the lower attaching portion of the reinforcing bar with respect to the lower attached portion of the floor panel is the second direction. Since the second direction is different from the first direction, even when a twisting force is given from the suspension attaching portion to the car body, the force is not shifted from the attaching portion of the upper attaching portions with the upper attached portions. Further, the force is not shifted from the attaching portion of the lower attaching portions with the lower attached portion. Accordingly, the rigidity of the structure of the rear portion of the car body can be sufficiently enhanced.

Further, the seat back disposed in front of the reinforcing bar can be protected in the longitudinal direction of the car by the reinforcing bar. That is, when a luggage loaded in the trunk room is coming toward the seat back side, it can be received by the reinforcing bar so that the seat back can be protected. Even when a shock is given from the back side in the case of collision, the seat back can be protected by the reinforcing bar. Further, it is possible to receive and support the seat back by the reinforcing bar from the back side of the car.

The reinforcing bar may include: a pair of pipes, central portions of which are connected to each other to be formed into an X-shape; a pair of right and left upper attaching brackets, each of which is welded and fixed to each of the upper end portions of the pipes; and a pair of right and left lower attaching brackets, each of which is welded and fixed to each of the lower end portions of the pipes; the upper attaching portions may be provided in the upper attaching brackets; and the lower attaching portions may be provided in the lower attaching brackets.

With the above configuration, since the reinforcing bar is formed out of a pipe, although the weight of the bar is small, the mechanical strength of the bar can be enhanced. Since the upper and lower attaching brackets are welded and fixed to each of the upper and lower end portions of the bar, by welding and fixing the upper and lower attaching brackets to the bar after the attaching bracket has been formed into a predetermined shape, it is possible to easily form the attaching bracket into a predetermined shape. When a twisting force is applied from the suspension attaching portion to the car body while the car is running, a compression force or a tensile force acts on each pipe and the reinforcing bar resists the compression force or the tensile force.

The upper attaching portions may be provided with a pair of right and left engaged portions adapted to be engaged with engaging portions provided in a seat back.

With the above configuration, since the reinforcing bar is sufficiently rigid as described above and the engaged portions are provided in the upper attaching portions of the reinforcing bar, it is possible to stably support the seat back by the reinforcing bar. Further, it is not necessary to attach an exclusive member with engaged portions to the partition panel. Alternatively, the number of the above exclusive members attached to the partition panel can be decreased. Therefore, it is possible to omit the labor and time needed for attaching the members and further the number of components can be reduced.

Each of the engaged portions may be provided with a groove, an upper side of which is open, so that the engaging portions engages with the engaged portions from above. With the above configuration, the engaging portions can be engaged to the engaged portions by falling down the seat back from above, and thereby the attaching work of the seat back can be simplified.

The partition panel may include: a front panel extending in the first direction and disposed in a rear side of a seat back; and a rear panel extending from an upper end portion of the front panel to a rear side of the car body; a partition member extending in a car width direction and having an L-shaped cross section may be disposed in a back side of the upper end portion of the front panel; an upper end portion of a vertical lateral wall of the partition member may be attached to the rear panel; a bent portion formed in a front end portion of a horizontal lateral wall of the partition member may be fixed to a back face of the front panel; a first reinforcing member may be fixed to a back face of the bent portion; the upper attached portions may be formed in a superimposed portion of the front panel, the bent portion and the first reinforcing member; and the upper attaching portions may be attached to a front face of the front panel and fixed to the upper attached portions with bolts.

With the above configuration, an annular cross section (longitudinal cross section) is formed by the L-shaped partition member, the front panel and the rear panel. Therefore, the rigidity of the upper end portion of the partition panel can be enhanced. In the vicinity of the portion in which the rigidity is enhanced, the upper attaching portions are put on the front face of the front panel and then the upper attaching portions, the front panel, the bent portion and the first reinforcing member are fastened and fixed together with the first attaching bolt. Accordingly, the upper attaching portions can be strongly attached to the upper attached portions by the above attaching and fixing structure.

A second reinforcing member may be fixed to a lower face of the floor panel; the lower attached portions may be formed in a superimposed portion of the floor panel and the second reinforcing member; and the lower attaching portions may be attached to an upper face of the floor panel and fixed to the lower attached portions with bolts.

A rear side member extending in a car length direction and having a U-shaped cross section may be disposed below the floor panel; both end portion of the rear side member may be attached to a back face of the floor panel.

By the U-shaped rear side member, an upper side of which is opened, and the floor panel, an annular cross section (longitudinal cross section) is formed, so that the rigidity of the floor panel can be enhanced. The lower attaching portions is put on an upper face of the floor panel and then the lower attaching portions, the floor panel and the second reinforcing member are fastened together and fixed with the second attaching bolt. Therefore, the lower attaching portions can be strongly attached to the lower attached portions by the above attaching and fixing structure.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7A is a plan view showing a state in which a bracket is attached to both end portions of a pipe composing a partition front bar; and FIG. 7B is a front view showing the same state as shown in FIG. 7A.

DETAILED DESCRIPTION OF THE EMBODIMENTS

Hereinafter, embodiments of the present invention will be described with reference to the accompanying drawings.

Concerning the car in which the above structure is employed, two car types are provided. One car type is a so-called trunk-through type car in which a passenger room and a trunk room are communicated with each other when a seat back 3 of a rear seat is tilted. The other car type is a so-called seat back fixing type car in which the seat back 3 of the rear seat is fixed to the car body. The opening portion 2 is formed so that the car can be made to be of the trunk-through type. However, even in the car of the seat back fixing type, in order to use the car body in common, the opening portion 2 is formed on the partition panel 1. The car of the present embodiment is of the seat back fixing type and the opening portion 2 is not utilized. Therefore, it is strongly desired that a deterioration of the rigidity of the rear portion of the car body, which is caused by the formation of the opening portion 2, is suppressed and the rigidity is enhanced. Therefore, a reinforcing structure for reinforcing the car body is provided. This reinforcing structure will be explained later.

Figure 1:
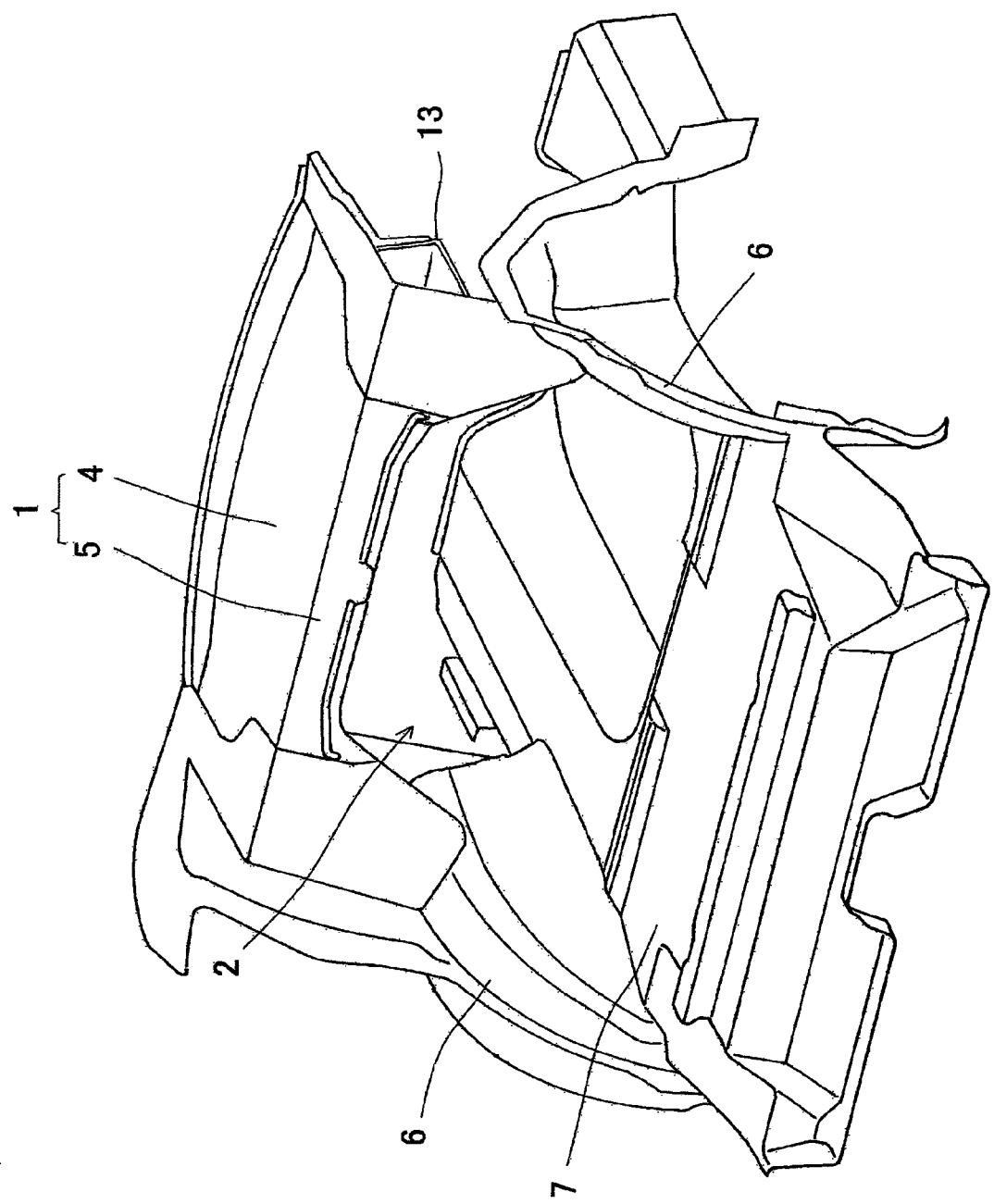
FIG. 1 is a perspective view showing an opening portion provided on a partition panel and also showing a structure in the periphery of the opening portion.
Figure 2:
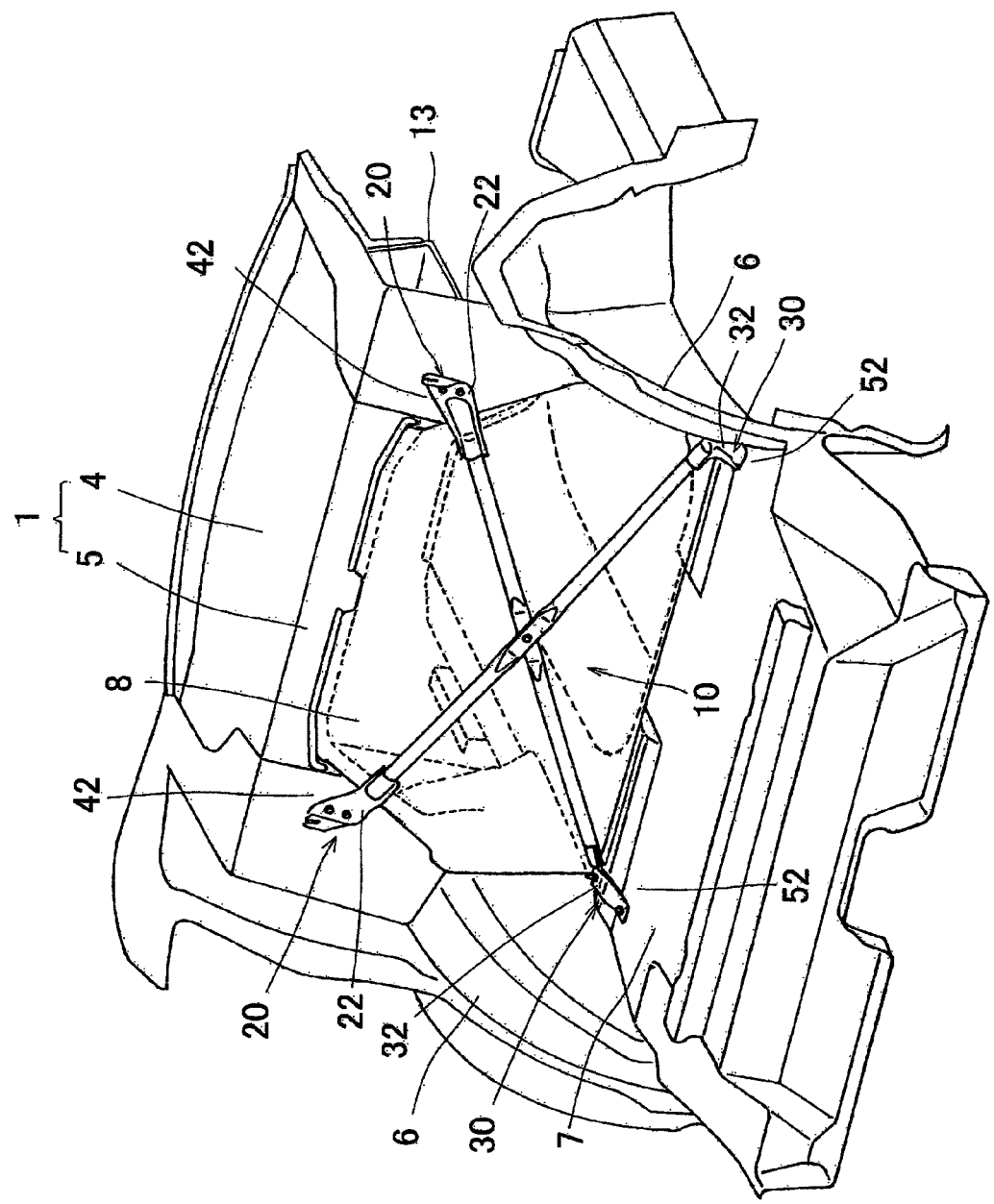
FIG. 2 is a perspective view showing a structure of a rear portion of a car body provided with a partition board.

As shown in FIG. 1, an upper half portion of the opening portion 2 is formed on the partition panel 1 and a lower half portion of the opening portion 2 is formed being surrounded by the right and the left wheel house inner panel 6 and the floor panel 7. As shown in FIG. 2, a shape of the partition board 8 substantially agrees with that of the opening portion 2. The partition board 8 is fixed to a circumferential portion of the opening portion 2 by means of clipping, so that a rear side of the seat back 3 can not be seen from the trunk room side.

[Structure of Partition Panel 1]

Figure 5:
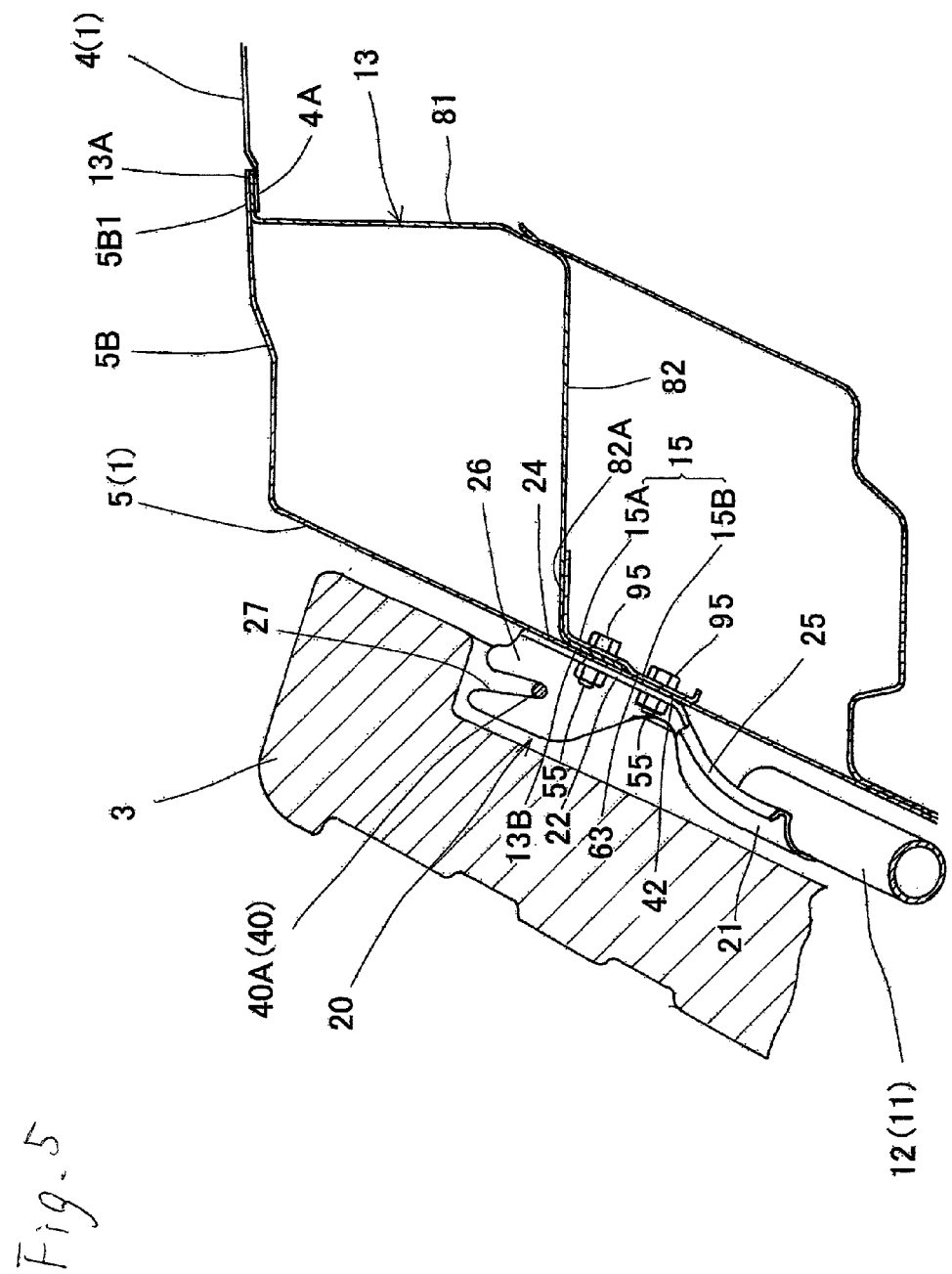
FIG. 5 is a sectional view showing an attaching structure of an attaching portion on the upper side and an attached portion on the upper side.

As shown in FIGS. 1 and 5, the partition panel 1 includes: a front panel 5 (partition front panel) which is vertically arranged on the back side of the seat back 3; and a rear panel 4 (partition rear panel) which is substantially horizontally arranged being extended from an upper end portion of the front panel 5 to the back side of the car. To be in more detail, the front panel 5 is inclined downward in the forward direction and an upper end portion of the front panel 5 is bent to the rear side. On the back side of the upper end portion of the front panel 5, a partition member 13 is arranged, the cross section of which is formed into an L-shape, extending in the width direction of the car. A first bent portion 13A, which is bent backward, formed in an upper end portion of the vertical lateral wall 81 of the partition member 13 is put on and welded to a front end portion 4A of the rear panel 4 from the upper side. A rear end portion 5B1 of the second bent portion 5B to the back side of the front panel 5 is put on and welded to the first bent portion 13A from the upper side.

Further, a third bent portion 13B to the lower side formed in the front end portion of the horizontal lateral wall 82 of the partition member 13 is put on and welded to a rear face of a front panel portion 63 of the front panel 5. A first reinforcing member 15, the shape of which is a plate-shape, which is bent into a C-shape, is welded and fixed to a lower face of the front end portion 82A of the horizontal lateral wall 82 of the partition member 13, a rear face of the third bent portion 138 and the rear face of the front panel portion 63 located in a lower portion.

A pair of first nuts 95 are respectively welded and fixed to a rear face of the upper half portion 15A of the first reinforcing member 15 and a rear face of the lower half portion 15B. A pair of first bolt insertion holes, the center of which is the same as that of the first nut 95, are formed in a piling portion in which the front panel portion 63, the third bent portion 13B and the first reinforcing member 15 are put on each other and also formed in a piling portion in which the front panel portion 63 and the first reinforcing member 15 are put on each other.

[Connecting Structure of Floor Panel 7 with Wheel House Inner Panel 6]

Figure 6:
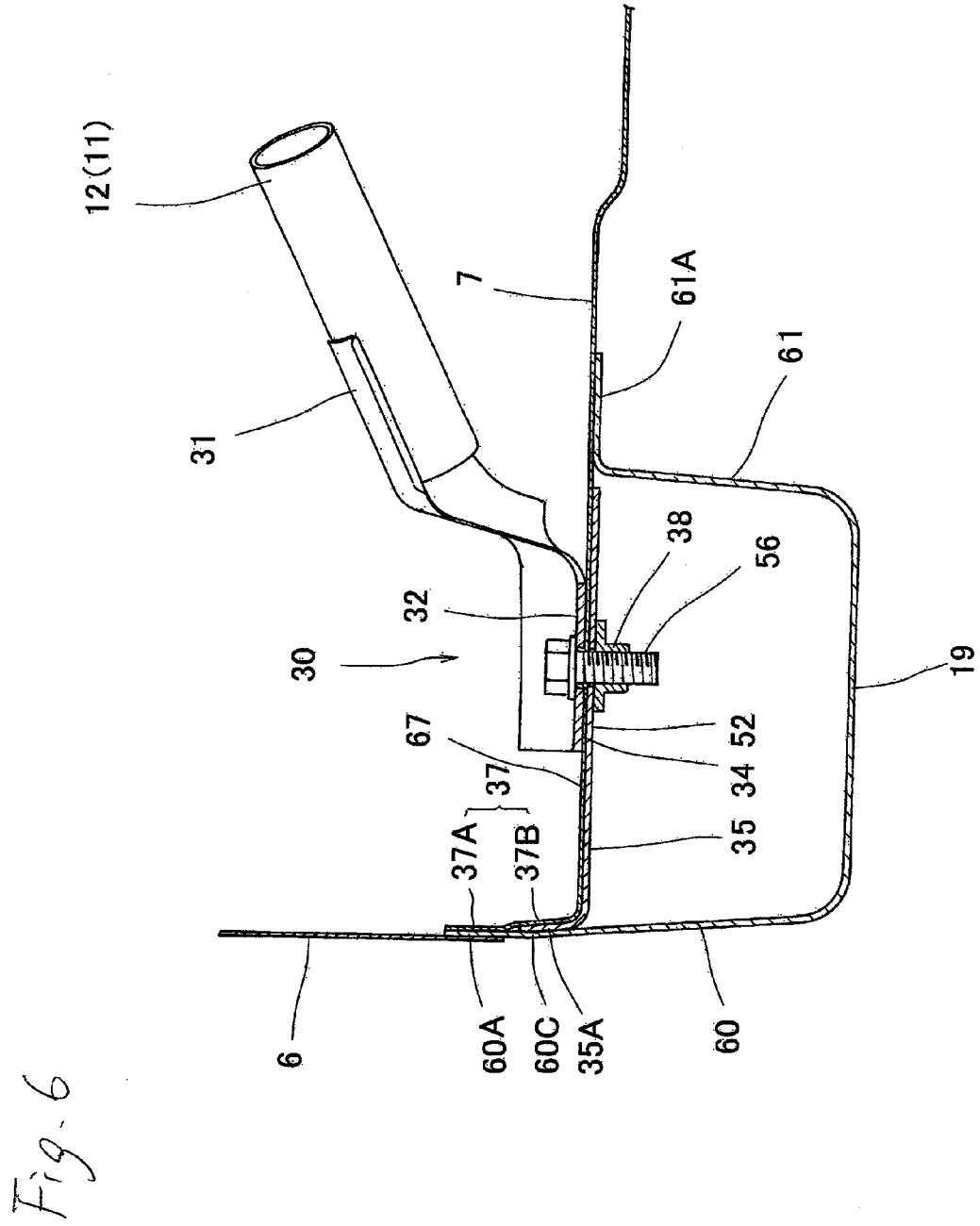
FIG. 6 is a sectional view showing an attaching structure of an attaching portion on the lower side and an attached portion on the lower side.

As shown in FIG. 6, on the lower side of a floor panel portion 67 on the wheel house inner panel 6 side, a rear side member 19 is arranged, the shape of which is a U-shape open to the upper side, extending in the longitudinal direction of the car. One side wall 60 of the rear side member 19 is attached to the wheel house inner panel 6. An upper end portion of the other side wall 61 is attached to a lower face of the floor panel portion 67. One side portion of the floor panel portion 67 is attached to the wheel house inner panel 6. The second reinforcing member 35 (seat belt reinforcing member) is put on the lower face of the floor panel portion 67.

One side wall 60 of the rear side member 19 is extended upward and its extending end portion 60A is put on and welded to an inside face of the lower end portion of the wheel house inner panel 6. The fourth bent portion 61A bent to the inside in the car width direction, which is formed on the other side wall 61, is put on and welded to the lower face of the floor panel portion 67. Further, the first rising wall 35A provided in one side portion in the car width direction of the second reinforcing member 35 is put on and welded to one side wall portion 60C, which is lower than the extending portion 60A of the rear side member 19, from the inside in the vehicle width direction. The upper half portion 37A of the second rising wall 37 provided in one side portion in the car width direction of the floor panel 7 is put on and welded to the extending end portion 60A of one side wall 60 of the rear side member 19 from the inside in the car width direction. The lower half portion 37B of the second rising wall 37 is put on and welded to the first rising wall 35A from the inside in the car width direction. A pair of second nuts 38 are welded and fixed to a lower face of the second reinforcing member 35. In the piling portion of the floor panel portion 67 and the second reinforcing member 35, the second bolt insertion hole, the center of which is the same as that of the second nut 38, is formed. Although not shown in FIG. 6, a portion on the central portion side in the car width direction of the second reinforcing member 35, is interposed between the fourth bent portion 61A and the floor panel 7. To be in more detail, under the condition that the fourth bent portion 61A, the portion on the central portion side in the car width direction of the second reinforcing member 35 and the floor panel 7 are put on each other, these three components are welded and fixed by means of spot welding.

[Reinforcing Structure of Rear Car Body]

Figure 3:
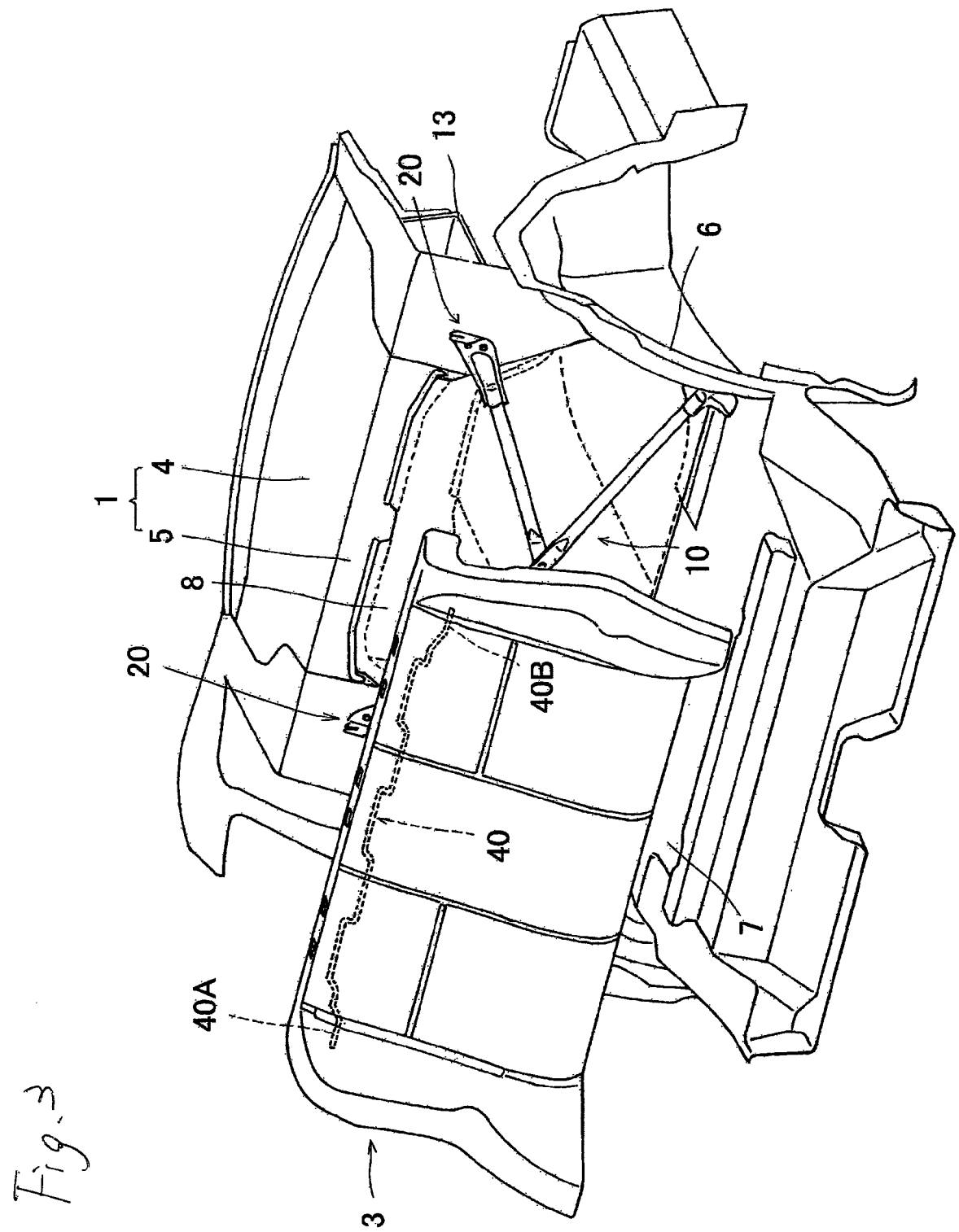
FIG. 3 is an exploded perspective view showing a structure of a rear portion of a car body provided with a seat back.
Figure 4:
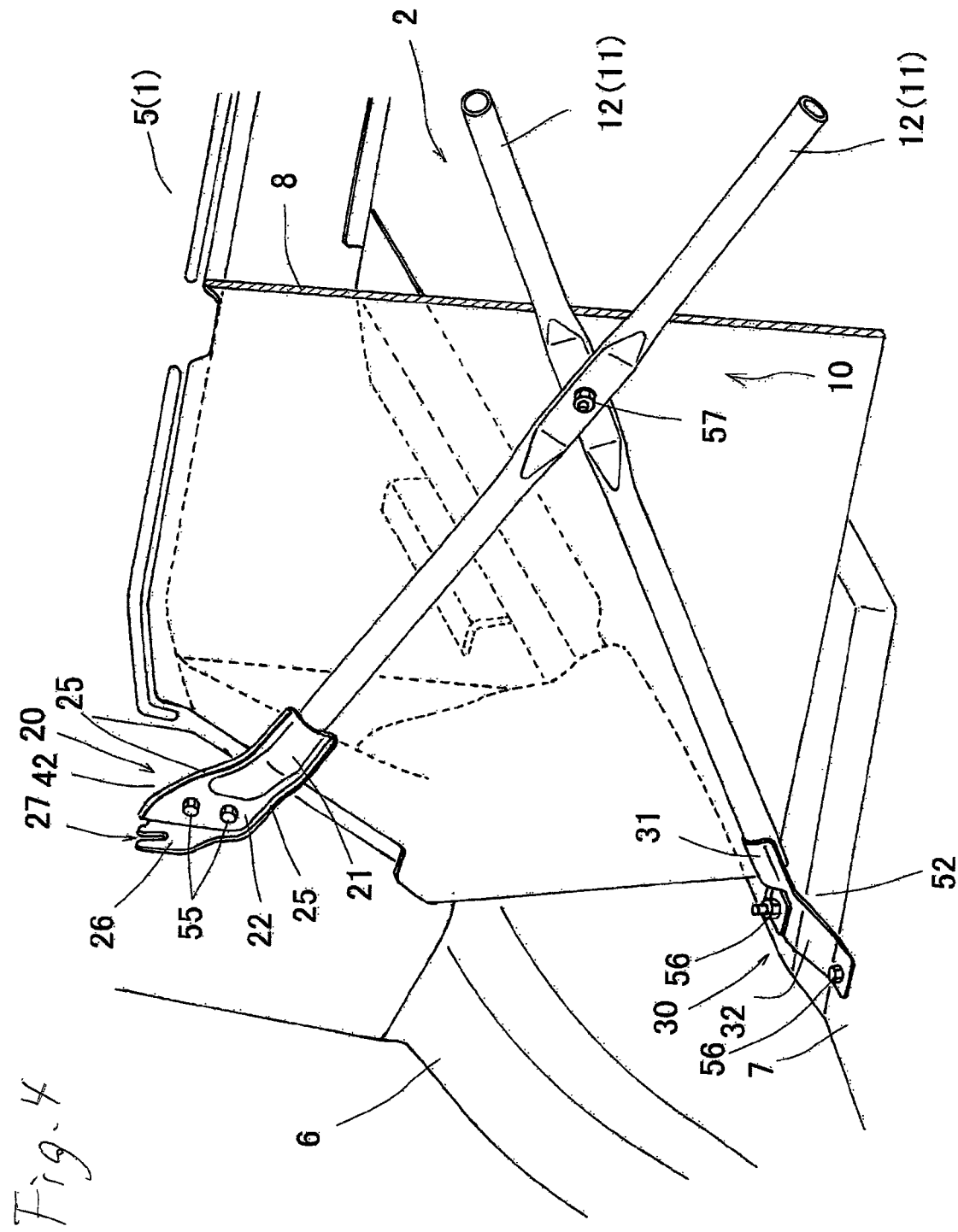
FIG. 4 is a perspective view showing an attaching structure of a partition front bar and a car body.

As shown in FIGS. 2 to 4, the X-shaped partition front bar 10, which corresponds to a reinforcing bar, is arranged in the front of the partition board 8 at an interval. The attaching portions 22 on the upper side respectively provided at a pair of end portions on the upper side, which are in the four end portions of the partition front bar 10, are respectively attached and fixed to a pair of attached portions 42 on the upper side, which are provided in an upper portion on the front face of the front panel 5, from the front side of the car. The attaching portions 32 on the lower side respectively provided in a pair of end portions on the lower side, which are in the four end portions described before, are respectively attached and fixed to a pair of attached portions 52 on the lower side provided on the upper face of the floor panel 7.

[Structure of Partition Front Bar 10]

As shown in FIG. 4, the partition front bar 10 includes: an X-shaped bar body 11 composed in such a manner that central portions in the longitudinal direction of a pair of circular pipes 12 made of metal are connected to each other; and attaching brackets 20, 30 made of sheet metal welded and fixed to the end portions of the bar body 11.

As shown in FIGS. 7A and 7B, the central portions in the longitudinal direction of the circular pipes 12 are pressed flat and put on each other in the longitudinal direction of the car and connected to each other by the third bolt 57. In this case, the longitudinal direction of the car is "a direction in which the front panel 5 inclined downward to the front and the front face cross each other making a right angle". The circular pipe portion 12a on one side in the longitudinal direction is bent a little to the reverse side of the flat face of the central portion in the longitudinal direction against the circular pipe portion 12b on another side. A head portion of the third bolt 57 is welded and fixed to the central portion in the longitudinal direction of the circular pipe 12.

In the four attaching brackets 20, 30, a pair of attaching brackets 20 on the upper side have the same structure. When the condition that the attaching portion 22 on the upper side is attached and fixed to the attached portion 42 on the upper side, the pair of right and left attaching brackets 20 become symmetrical to each other in the lateral direction. As shown in FIGS. 4, 5, 7A and 7B, each attaching bracket 20 has a first connecting portion 21, the cross section of which is semicircular. This first connecting portion 21 is externally attached and welded to one end portion of the circular pipe 12 from the front side of the car. Further, the attaching portion 22 on the upper side is extended outside in the longitudinal direction of the circular pipe 12 from the first connecting portion 21. As described above, the attaching portions 22 on the upper side are respectively provided in the pair of attaching brackets 20 on the upper side.

The attaching portion 22 on the upper side is formed into a substantially triangular plate when it is viewed in the longitudinal direction of the car. The attaching portion 22 on the upper side is provided with a pair of third bolt insertion holes 23. The first attaching face 24 (as seen in FIG. 5), which is one plate face of the attaching portion 22 on the upper side, is directed to the rear side of the car. To be in more detail, the rear side of the car is "a rear side of the car in a direction in which the front panel 5 inclined downward and the front face cross each other making a right angle". Both end portions in the width direction of the first connecting portion 21, that is, both end portions in a direction corresponding to the radial direction of the circular pipe 12 are extended outside in the radial direction of the circular pipe 12. The extending end portion and the circumferential portion of the attaching portion 22 on the upper side are raised on the front side of the car so that the reinforcing rib 25 can be composed.

One side portion (one portion of the circumferential portion of the attaching portion 22 on the upper side) of the attaching portion 22 on the upper side, which is located outside of the circular pipe 12 in the longitudinal direction of the circular pipe 12, is inclined with respect to the longitudinal direction of the circular pipe 12. When this one side portion is raised longer than the reinforcing rib 25, the third rising wall 26 is composed. On this third rising wall 26, the engaging groove 27, which corresponds to an engaged portion, is formed by means of cutting out. The engaging groove 27 is formed long and slender. Under the condition that the attaching portion 22 on the upper side is attached to the attached portion 42 on the upper side of the front panel 5, an upper side of the engaging groove 27 is open. Under the condition that the attaching portion 22 on the upper side is attached to the attached portion 42 on the upper side, both wall faces of the third rising wall 26 are directed to the lateral direction (the car width direction) of the car. Therefore, both wall faces of the third rising wall 26 are laid in the longitudinal direction and the vertical direction of the car. The end portions 40A, 40B, which correspond to engaging portions, of the wire 40 provided in the seat back 3 are engaged with the engaging groove 27 from above. A central portion in the longitudinal direction of the wire 40 is engaged with the engaging groove provided in an upper portion of the center in the lateral direction of the front panel 5. A lower portion of the seat back 3 is fastened and fixed to the car body with bolts. The pair of attaching brackets 20 on the upper side is thicker than the pair of attaching brackets 30 on the lower side.

The pair of right and left brackets 30 on the lower side have the same structure. When the attaching portion 32 on the lower side is attached and fixed to the attached portion 52 on the lower side, the pair of right and left brackets 30 become symmetrical to each other in the lateral direction. As shown in FIGS. 4, 6, 7A and 7B, the pair of right and left brackets 30 on the lower side respectively have the second connecting portion 31, the cross section of which is semicircular. This second connecting portion 31 is externally engaged with and welded to one end portion of the circular pipe 12 from the upper side. The attaching portion 32 on the lower side is extended outside in the longitudinal direction of the circular pipe 12 from the second connecting portion 31. As described above, the pair of right and left attaching brackets 30 on the lower side are respectively provided with the attaching portion 32 on the lower side.

The attaching portion 32 on the lower side is formed into a rectangular plate shape, which is long in the longitudinal direction of the car, when it is viewed from above. The lower attaching portion 32 is provided to the front and rear of the car with a pair of fourth bolt insertion holes 33. The attaching portion 32 on the lower side is bent downward corresponding to a protruding shape on the upper face of the floor panel 7. The second attaching face 34 (as seen in FIG. 6), which is one plate face (lower plate face) of the attaching portion 32 on the lower side, is formed into a C-shape when it is viewed in the car width direction. The plate member 70 is put on and welded to an upper face portion on the side of one of the fourth bolt insertion holes 33. The second attaching face 34 is directed downward. Accordingly, the second attaching face 34 is twisted with respect to the first attaching face 24.

[Attaching Structure of Partition Front Bar 10]

(1) Attaching and Fixing Structure of Attaching Portion 22 on Upper Side to Attached Portion 42 on Upper Side:

The attaching portions 42 on the upper side are provided in the front panel portion 63, the third bent portion 13B and the first reinforcing member 15. To be in more detail, as described above, one of the first bolt insertion holes is formed in the front panel portion 63, the third bent portion 13B and the first reinforcing member 15. The other of the first bolt insertion holes is formed in the front panel portion 63 and the first reinforcing member 15. In this way, the attached portion 42 on the upper side is composed. The upper attaching portion 22 is put on the front face of the front panel portion 63. The attaching portion 22 on the upper side, the front panel portion 63, the third bent portion 13B and the first reinforcing member 15 are fastened and fixed together by the first attaching bolt 55 which is inserted into one of the first bolt insertion holes. The upper attaching portion 22, the front panel portion 63 and the first reinforcing member 15 are fastened and fixed to each other by the first attaching bolt 55 inserted into the other of the first bolt insertion holes. The two first attaching bolts 55 are screwed and fastened to the two first nuts 95. As described above, the attaching portions 22 on the upper side respectively provided in the pair of right and left end portions on the upper side, which are in the four end portions of the partition front bar 10, are respectively attached and fixed from the front side of the car to the pair of right and left attached portions 42 on the upper side provided in an upper portion on the front face of the partition panel 1.

Both end portions on the right and left of the front panel 5 are extended downward and attached to an upper portion of the wheel house inner panel 6 swelling out into the passenger room. As a result, the rigidity of the front panel 5 is enhanced.

(2) Attaching Structure of Attaching Portion 32 on Lower Side to Attached Portion 52 on Lower Side The above attached portions 52 on the lower side are provided in the floor panel portion 67 and the second reinforcing member 35. To be in more detail, as described above, the second insertion holes are formed in the floor panel portion 67 and the second reinforcing member 35, so that the attaching portions 52 on the lower side can be composed. The lower attaching portion 32 is put on an upper face of the floor panel portion 67. The attaching portion 32 on the lower side, the floor panel portion 67 and the second reinforcing member 35 are fastened and fixed together by the second attaching bolt 56 inserted into the second bolt insertion hole. The second attaching bolt 56 is screwed and fastened to the second nut 38. As described above, the attaching portions 32 on the lower side, which are respectively provided in the pair of right and left end portions on the lower side in the four end portions of the partition front bar 10, are respectively attached and fixed to the pair of right and left attached portions 52 on the lower side provided on an upper face of the floor panel 7.

[Another Embodiment]

Both end portions of the pipe 12 may be pressed flat and the attaching portion 22 on the upper side and the attaching portion 32 on the lower side may be provided on the formed flat portions without providing the attaching brackets 20, 30.

In the above described embodiments, the attaching portions are fixed to the attached portions with the bolts. However, the attaching portions may be fixed by the other attaching means such as welding.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A structure of a rear portion of a car body, comprising:
   a partition panel, extending in a first direction to partition a passenger room from a trunk room in the rear portion of the car body and provided with an opening;
   a floor panel, extending in a second direction which is different from the first direction;
   an X-shaped reinforcing bar;
   wherein upper attaching portions respectively arranged in a pair of right and left upper end portions of the reinforcing bar are fixed to upper attached portions formed on the partition panel;
   wherein lower attaching portions respectively arranged in a pair of right and left lower end portions of the reinforcing bar are fixed to lower attached portions formed on the floor panel, and
   wherein the upper attaching portions are provided with a pair of right and left engaged portions adapted to be engaged with engaging portions provided in a seat back.

2. The structure as set forth in claim 1,
   wherein the reinforcing bar includes:
   a pair of pipes, central portions of which are connected to each other to be formed into an X-shape;
   a pair of right and left upper attaching brackets, each of which is welded and fixed to each of the upper end portions of the pipes; and
   a pair of right and left lower attaching brackets, each of which is welded and fixed to each of the lower end portions of the pipes;
   wherein the upper attaching portions are provided in the upper attaching brackets; and
   wherein the lower attaching portions are provided in the lower attaching brackets.

3. The structure as set forth in claim 1, wherein each of the engaged portions is provided with a groove, an upper side of which is open, so that the engaging portions engages with the engaged portions from above.

4. The structure as set forth in claim 1,
   wherein the partition panel includes:
   a front panel extending in the first direction and disposed in a rear side of a seat back; and
   a rear panel extending from an upper end portion of the front panel to a rear side of the car body;
   wherein a partition member extending in a car width direction and having an L-shaped cross section is disposed in a back side of the upper end portion of the front panel;
   wherein an upper end portion of a vertical lateral wall of the partition member is attached to the rear panel;
   wherein a bent portion formed in a front end portion of a horizontal lateral wall of the partition member is fixed to a back face of the front panel;
   wherein a first reinforcing member is fixed to a back face of the bent portion;
   wherein the upper attached portions are formed in a superimposed portion of the front panel, the bent portion and the first reinforcing member; and
   wherein the upper attaching portions are attached to a front face of the front panel and fixed to the upper attached portions with bolts.

5. The structure as set forth in claim 1,
   wherein a second reinforcing member is fixed to a lower face of the floor panel;
   wherein the lower attached portions are formed in a superimposed portion of the floor panel and the second reinforcing member; and
   wherein the lower attaching portions are attached to an upper face of the floor panel and fixed to the lower attached portions with bolts.

6. The structure as set forth in claim 5,
   wherein a rear side member extending in a car length direction and having a U-shaped cross section is disposed below the floor panel;
   wherein both end portion of the rear side member are attached to a back face of the floor panel.

* * * * *